Jan. 1, 1952 R. L. SINK 2,581,211
RANGE TRACKING PULSE-ECHO SYSTEM
Filed July 3, 1944 3 Sheets-Sheet 1

APERTURE PULSE
ECHO PULSES
RADIATED PULSE

RANGE CALIBRATION PULSES

Inventor:
Robert L. Sink,
by Harry E. Dunham
His Attorney.

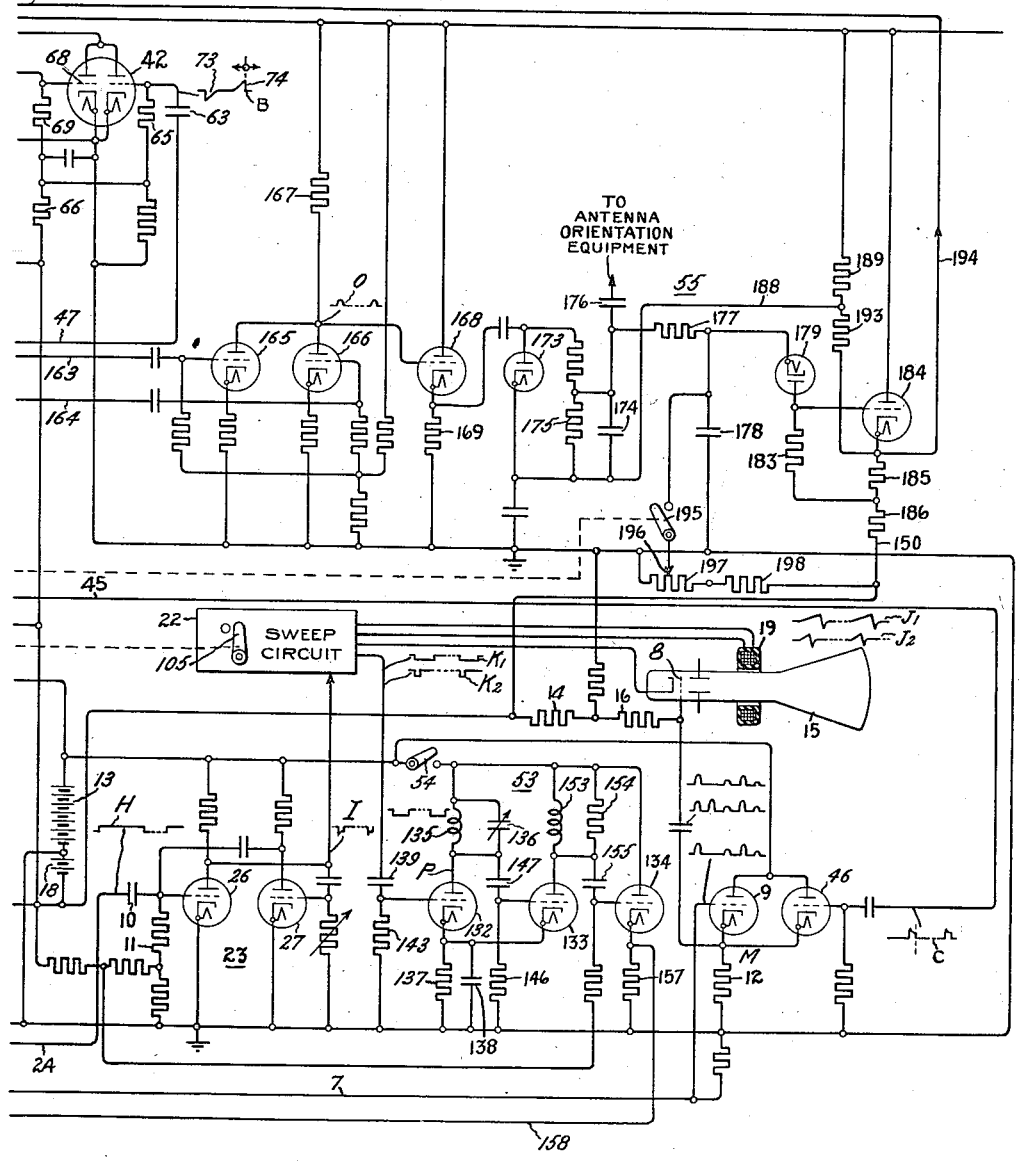

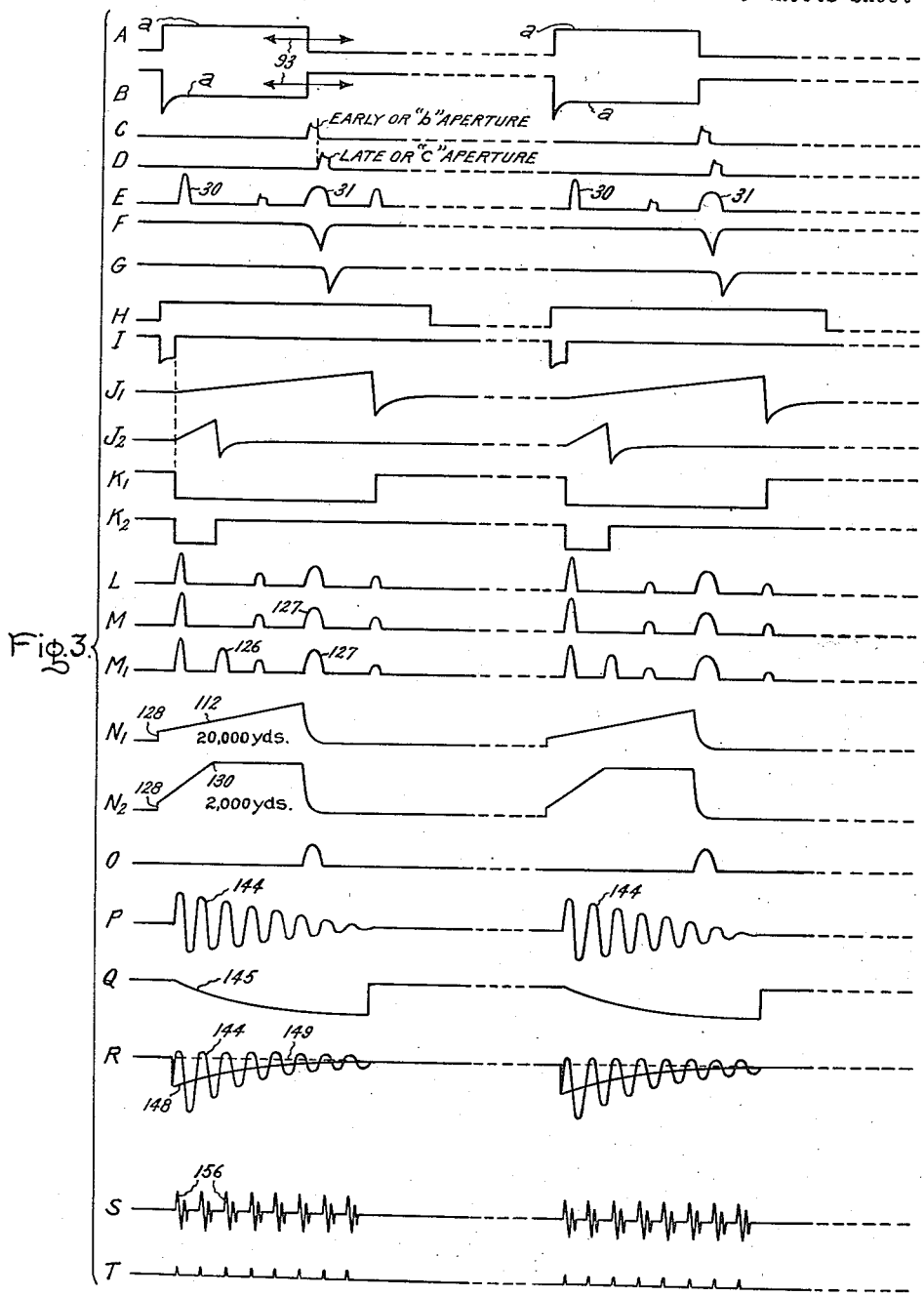

Patented Jan. 1, 1952

2,581,211

UNITED STATES PATENT OFFICE 2,581,211

RANGE TRACKING PULSE ECHO SYSTEM

Robert L. Sink, Scotia, N. Y., assignor to General Electric Company, a corporation of New York Application July 3, 1944, Serial No. 543,235

21 Claims. (Cl. 343—13)

My invention relates to pulse echo systems and particularly to such systems of the range tracking type.

In copending application Serial No. 400,080, filed June 27, 1941, by William C. Hahn, and which is assigned to the assignee of this present application, is disclosed and claimed a range tracking pulse echo system in which a particular echo of a transmitted pulse is selected from all of the echoes which may be received, and a range indication is produced continuously in response to the selected echo throughout any variations in the range from which the selected echo is received.

My present invention relates to pulse echo systems of this type and it has for one of its objects to provide improved means for producing the range tracking operation.

Another object of my invention is to provide improved range indicating means.

A further object of my invention is to provide means to generate locally artificial echo pulses spaced in desired fixed time relation to the transmitted pulses and to utilize such artificial pulses in the calibration of the range indicating device or devices.

Various other objects of my invention will appear from the following description of my invention.

By the term echo, or echo pulse, as used herein, I refer to any pulse received as a result of a pulse transmitted by the equipment whether the received pulse be produced by reflection from a remote object, or by reason of operation of apparatus carried by such remote object, as for example radio apparatus operating in response to the transmitted pulse to relay, or transmit back to the equipment, the pulse which I shall refer to as an echo of the transmitted pulse.

Figure 4:
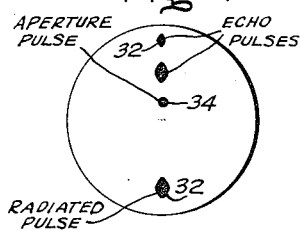
Figure 5:
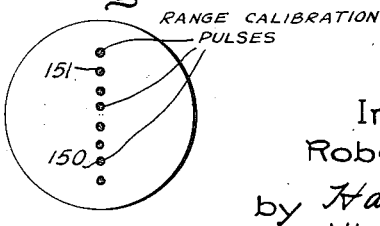

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Figs. 1 and 2 taken together represent an embodiment of my invention; Fig. 3 represents certain characteristics pertaining to its operation; and Figs. 4 and 5 represent pulse indications on the viewing screen of cathode ray indicator 15 of Fig. 2, under two different conditions of operation.

Figure 1:
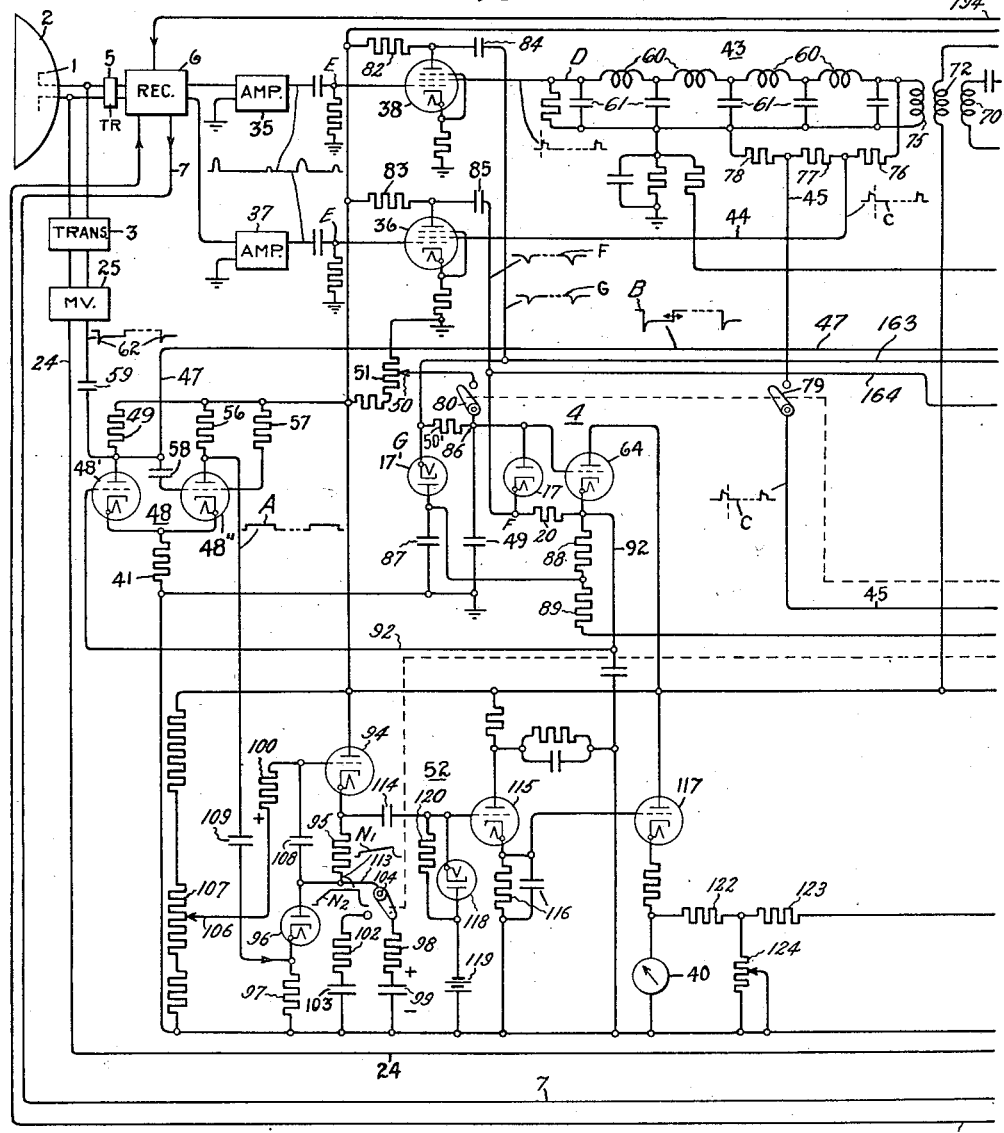

Referring to Fig. 1 of the drawings I have indicated in the upper left-hand corner thereof an antenna 1 arranged within a parabolic reflector 2 and connected to be supplied with recurrent high frequency pulses from a transmitter 3 to be radiated into space. The parabola 2 is provided to direct the waves into a sharp beam, which, in many applications, may be directed at a small angle to the axis of the parabola 2. In such applications the antenna 1 may be rotated about the focus of the parabola thereby to rotate the beam of radiant energy about the surface of a cone having an axis coincident with the axis of the parabola. Such systems are used in automatic tracking systems, for example, such as is shown in the copending application of Sidney Godet filed October 8, 1941. Serial No. 414,126, entitled Directive Radio System, now Patent 2,412,612, issued December 17, 1946, and assigned to the assignee of my present application.

Echoes of the radiated pulses received in this antenna are supplied from the antenna 1 through the usual TR box 5 to a receiver 6 where they are converted in frequency, amplified, and detected to produce unidirectional pulses corresponding to the outgoing pulse and to each of its received echoes. These unidirectional pulses are supplied over a channel 7 including an electron discharge device 9, shown in Fig. 2, which operates as a cathode follower, to the control electrode 8 of a cathode ray indicator 15 shown in Fig. 2 to increase the intensity of the ray in accord with the intensity of each of the different received pulses. The control electrode 8 is biased negatively, by connection through resistors 16 and 14 to a suitable source of negative bias potential, represented by battery 18, so that the ray is of low intensity or cut off in the absence of applied pulses.

This cathode ray device is provided with a deflection coil 19, which is supplied with a sawtooth current wave from a sweep circuit generator 22. Generator 22 is synchronized by means of pulses, represented by wave I of Fig. 3, from a multivibrator 23. This multivibrator is in turn keyed by means of a trigger voltage, represented by wave H of Fig. 3, supplied thereto over conductor 24 from a multivibrator 25, which also controls the transmitter 3.

The multivibrator 25 is one of the so-called free running type, which operates at a frequency which is not rigorously controlled and which may be subject to considerable variation. At a fixed point in each cycle of its operation it supplies a pulse of voltage to the transmitter 3 to determine the time of radiation of each radiated pulse. It also supplies a square wave to multivibrator 23, which operates to supply a brief pulse of current to the sweep circuit 22 to initiate the sawtooth current wave in the deflection coil 19 thereby to deflect the beam of the cathode ray tube 15 across the screen 28 during a predetermined period beginning at a time fixed with relation to each radiated pulse and continuing for a predetermined period. In this way illuminated spots appear on the viewing screen corresponding to the different received pulses.

In Figs. 4 and 5 are shown two circles each of which represents an end view of the viewing screen 28 of the cathode ray tube 15, but under two different conditions of operation to be described shortly. On this screen different indications appear in accord with the operations desired. For example, under one condition of operation, as represented in Fig. 4, a bright spot 32 is produced by the outgoing pulse, whereas the spots 33 are produced at positions spaced above spot 32 along a vertical axis, the spots 33 being produced by echoes thereof received in the receiver.

It is desired to select one of these echoes by the equipment to be described and to indicate continuously the range of the object producing such selected echo during any movements of such object. It is also desired that this indication of distance be produced upon an indicator such as the milliammeter indicated at 40 in the lower portion of Fig. 1 and that a suitable indication on the viewing screen of the cathode ray device of the particular echo selected be produced.

To this end, the range tracking system of Figs. 1 and 2 is employed. This range tracking system comprises the multivibrator 48 (in the left center portion of Fig. 1) which produces pulses, each of which is initiated upon radiation of a corresponding transmitted pulse and terminated slightly prior to the reception of the desired echo to be selected. The pulses are supplied over conductor 47 to a normally inactive pulse generator 42. This generator, on termination of each such pulse, produces a short aperture pulse of about the duration of the echo to be selected, and supplies it to the screen grids of two normally inoperative pulse amplifiers 36 and 38, to the first directly, as by conductor 44, and to the second after delay produced by delay network 43. In this way these amplifiers operate during successive short time intervals, or apertures of time, and when operative they transmit the echo received during such apertures of time from the receiver 6 to differential device 4.

Differential device 4 integrates the intensity of the echoes received during the two apertures of time when amplifiers 36 and 38 are operative and produces on condenser 49 a voltage corresponding to the difference in the two integrals. This voltage is effective, through amplifier 64 and conductor 92, to control the length of the pulse produced by the multivibrator 48. In this way, the aperture pulse produced by generator 42 is maintained in time coincidence with the received echo during variations in the distance to the object producing the echo.

The pulse wave produced by multivibrator 48 is also supplied to equipment 52, in the lower portion of Fig. 1, which, in turn, controls the range indicating meter 40 in accord with the length of the pulses produced by multivibrator 48.

By closing switch 79 (in the right center portion of Fig. 1), the aperture pulse produced by aperture generator 42 may be supplied over conductor 45 and amplifier 46 to the control electrode of the cathode-ray device, thereby producing a spot on the cathode ray screen which may be coincident with, and may obscure, the selected echo indication. Such a spot may be that indicated at 34 in Fig. 4.

The spot 34 produced by the aperture pulse may be moved from coincidence with the echo indication by varying the position of contact 50 on potentiometer 51, shown in Fig. 1 (near the center), thereby varying the charge on condenser 49 and consequently varying the time of occurrence of the aperture pulse.

In the lower portion of Fig. 2, I have represented a calibration circuit 53, which may be employed by closing switch 54 to produce desired artificial echo pulses having fixed relation to the transmitted pulse and being regularly spaced in time. These artificial echo pulses produce on the viewing screen a number of equally spaced indicia which may be utilized in a manner later to be explained to aid in calibrating the range indicating meter 40.

In the upper portion of Fig. 2 at 55, I have represented an improved means responsive to the particular echo which is selected to control the gain of the receiver 6.

Having now generally indicated the character of the equipment to be described, I shall proceed with a more detailed description of its operation, referring to the curves of Fig. 3.

Considering first the multivibrator 48 of Fig. 1, this multivibrator comprises a pair of electron discharge devices 48' and 48" each having an anode, cathode and control electrode. The cathodes are connected together and to ground through a common resistance 41, and the anodes are connected to the positive side of the source of operating potential 13 through individual resistances 49 and 56. The control electrode of discharge device 48" is also connected to the positive side of the source of operating potential through resistance 57 so that device 48" is normally conducting. Current flowing therein and in resistance 41 biases device 48' beyond cut-off and that device is non-conductive.

The anode of device 48' is connected to the control electrode of device 48" through a coupling condenser 58, and through a condenser 59 to the free running multivibrator 25. Simultaneously with the radiation of each transmitted pulse, or slightly prior thereto, a sharp negative pulse, of the general form indicated at 62 in Fig. 1, is supplied by multivibrator 25 through condenser 59 to the anode of device 48' driving it less positive, and also through condenser 58, which has a charge thereon, driving the control electrode of device 48", sufficiently negative materially to reduce the current on that device. This reduction in current reduces the current in resistance 41 and thus reduces the bias between the cathode and control electrode of device 48' permitting current to flow in that device. This current produces a drop in voltage on resistance 49, which further lowers the potential on the control electrode of device 48", this action being regenerative and rendering device 48" abruptly nonconducting and device 48' conducting. This condition then remains while condenser 58 remains sufficiently charged. The charge on this condenser, however, gradually leaks off through resistances 49 and 57 until finally discharge device 48" again becomes conducting. When this occurs, the current flowing in resistance 41 increases, thereby increasing the negative bias between the cathode and control electrode of device 48', reducing the current in that device and through action of condenser 58 causing the potential of control electrode of device 48" to vary in the positive direction, this action being regenerative and abruptly restoring the initial condition of conductivity in device 48" and nonconductivity in device 48'.

The result is that a square wave is produced on the anode of device 48' of the form indicated at B in Figs. 1 and 3 and which is supplied over conductor 47 and condenser 63 to the right-hand control electrode of discharge device 42. A further square wave of opposite polarity and of the form indicated at A in Figs. 1 and 3 appears on the anode of device 48'' and is supplied to the equipment 52 to control the range indicator 40.

The negative pulses of the wave B, which I shall refer to as the "$a$" pulses, and likewise the positive pulses of the wave, are thus initiated upon, or at a time having fixed relation to, radiation of each outgoing pulse and are of duration dependent upon the time required for condenser 58 to discharge sufficiently to permit device 48'' to become conducting. Of course, the degree of discharge of condenser 58 required to render device 48'' conducting is dependent upon the magnitude of current passed by device 48' and the resulting potential on resistances 49 and 41. This, in turn, is dependent upon the potential on the control electrode of device 48', which is connected to the cathode of discharge device 64 in the differential device 4 presently to be described.

As previously stated, the square wave B is supplied over conductor 47 and through condenser 63 to the right-hand control electrode of discharge device 42. This control electrode is connected through resistances 65 and 66 to the negative side of a source of bias potential 18, which may be of 150 volts, so that this device is normally nonconducting. Discharge device 42 comprises two triodes and has a left-hand control electrode 68 also biased negatively through resistances 69 and 66 so that the left-hand triode is also nonconducting. The left-hand grid 68 is connected through a winding 70 to the cathode. The anodes of the two triodes are connected together and through a winding 72, which is coupled to winding 70, to the positive side of the source of operating potential 13.

Condenser 63 and resistance 65 operate to differentiate the square wave B to produce first a negative pulse indicated at 73 in Fig. 2 and then a positive pulse indicated at 74 in Fig. 2, the negative pulse occurring at the beginning of each pulse $a$ and the positive pulse being at the termination of each pulse $a$. The negative pulse 73 has no effect since device 42 is already nonconducting. The positive pulse produces current therein. This current flowing in primary winding 72 induces an electromotive force in secondary winding 70 causing control electrode 68 to become positive thereby increasing the current in winding 72. This further increases the voltage on the control electrode 68, this action being regenerative and continuing until saturation of the left-hand section of the discharge device 42. At this time the increase in current in winding 72 ceases and the potential on secondary winding 70 reverses thereby tending to drive the grid 68 negative. This reduces the current in winding 72 thereby increasing the negative voltage on the grid 68, this action continuing until the left-hand section of device 68 is again nonconducting. Thus the original nonconductive condition of both sections of device 42 is restored. In this way a very brief aperture pulse is produced having a time duration which may be about equal to the duration of the radiated pulses.

This aperture pulse is induced in a further secondary winding 75 which is connected through the delay network 43, comprising series inductances 69 and shunt capacitors 61, to the screen grid electrode of amplifier 38. This winding 75 is also shunted by a plurality of series connected resistances 76, 77 and 78, the point between resistances 76 and 77 being connected to the screen electrode of device 36. In this way this aperture pulse is applied directly, i. e., without delay, to the screen grid of amplifier 36 to render that amplifier operative during the aperture, and it is supplied after some delay produced by network 43 to the screen grid of device 38 to render that device operative. This delay may be about equal to the length of the aperture pulse.

These amplifiers 36 and 38 are connected in parallel paths between the output of the receiver 6 and the differentiator 4, one path including the pulse amplifiers 35 and 38 and the other including the amplifiers 37 and 36.

The aperture pulse supplied to the screen grid of device 36 is represented by the curve C of Fig. 3 and that supplied to the screen grid of device 38 is indicated by the curve D of Fig. 3. The pulses of the curve C may be referred to as the early, or $b$, aperture and the pulses of the curve D may be referred to as the late, or $c$, aperture. These pulses define brief intervals or apertures of time, occurring in succession immediately upon termination of the $a$ pulses of wave B to render amplifiers 36 and 38 operative to transmit echoes from the receiver 6 to the differential device 4.

The amplifiers 36 and 38 are of the usual screen and suppressor grid type, and the anodes thereof are connected through respective resistances 82 and 83 to the source of operating potential and through respective coupling condensers 84 and 85 to the differential device 4. The control electrodes thereof are connected to the respective outputs of pulse amplifiers 35 and 37 the inputs of which are connected to the output of receiver 6.

Considering first the early aperture pulse, or $b$ aperture, this pulse causes device 36 to become conducting and produces a drop in potential on resistance 83. This drop in potential is of a magnitude dependent on the echo received simultaneously therewith and supplied to the control electrode of this amplifier. This drop in potential is supplied through condenser 85 and diode 17 of the differential device 4 to condenser 49. That is, assuming a certain initial charge in condensers 85 and 49, condenser 49 being charged positively with respect to ground, when device 36 becomes conducting, the cathode of diode 17 is driven negative with respect to its anode and electrons flow from condenser 85 through diode 17 into condenser 49 thereby discharging condenser 85 and decreasing the positive charge in condenser 49. This drives the control electrode of amplifier 64 decreasingly positive with respect to ground. Since the amount of this change in charge is dependent upon the intensity of any echo received in the receiver and transmitted through amplifiers 37 and 36 at the instant of this early, or $b$, aperture, the variation in voltage on condenser 49 is an integral of the received echo pulse over the interval of this early, or $b$, aperture.

During the late aperture pulse, or $c$ aperture, which is supplied to the screen grid of device 38, this device becomes conducting and passes current through resistance 82, which reduces its anode potential. Again assuming a certain initial charge in condensers 84 and 87, condenser 87 being charged positively with respect to ground, the cathode of diode 17' is driven negative with respect to the anode thereof during the period of this late, or c, aperture and the diode 17' becomes conducting. Electrons then flow from condenser 84 through diode 17 and to condenser 87. In other words, condenser 84 partially discharges, the extent of the discharge being dependent on the intensity of the echo received during this c aperture. The amount of this discharge is dependent upon the intensity of the received echo integrated over the b aperture. Electrons which previously during the b aperture flowed into condenser 49, now, during the c aperture, flow out of that condenser through resistance 50' into condenser 84.

Thus during the operation of the equipment and the repeated transmission of pulses from the antenna, condensed 49 assumes a charge dependent upon the difference in the integrated intensities of the echo received during the b and c apertures. If the portion of the echo received during the b aperture is greater than that received during the c aperture, then condenser 49 is gradually discharged, whereas if the portion of the echo that is received during the c aperture is greater than that received during the b aperture, this charge gradually increases. This condenser is connected between the control electrode of amplifier 64 and ground, the cathode of this amplifier being connected through resistances 88 and 89 to the negative side of the source of bias potential 18, which may be of 150 volts. Thus the drop in potential on these resistances 88 and 89 varies in accord with the charge on condenser 49. The variations in potential on the cathode of amplifier 64 are supplied through conductor 92 to the control electrode of device 48' in the multivibrator 48 to control the duration of the a pulses of wave B, and hence to control the time of occurrence of the b and c apertures. Thus the termination of the a pulses of wave B of Fig. 3 may be moved either to the right or to the left in time, as indicated by the arrows 93 thereon, moving, of course, the early and late apertures simultaneously therewith. The operation is such as to cause these apertures to occur simultaneously with the selected echo so that the selected echo occurs equally in the two aperture pulses.

Curve E in Fig. 3 represents a train of pulses received in the receiver and supplied over conductor 7 to the control electrode of the cathode ray tube, and supplied also through respective amplifiers 35 and 37 to the control electrodes of the normally inoperative amplifiers 38 and 36. In this curve the pulses 30 may correspond to the radiated pulses, and the other pulses of this curve may correspond to echoes thereof. Echo 31 is represented as received about equally during the b and c apertures and consequently each of them produces about an equal flow of current in the respective diodes 17 and 17', as represented by the pulses of the curves F and G of Fig. 3. This means that the condenser 49 maintains a substantially contsant charge, as would be the case if the object producing the echo remains at a constant distance from the equipment.

No other pulses appear in these curves F and G since amplifiers 36 and 38 are inoperative at all other times.

If the remote target from which the echo is received approaches the equipment, a larger portion of the echo is repeatedly received during the early, or b, aperture, with the result that the condenser 49 becomes decreasingly charged thereby reducing the current in amplifier 64 and increasing the bias potential on the control electrode of device 48'. This in turn reduces the current in resistances 49 and 41 and hence the amount that condenser 58 must discharge to render device 48" conductive. This shortens the period of the a pulses of the curve B and thus tends to keep the b and c apertures in coincidence with the echo received from the particular selected target. The opposite effect occurs as the remote target moves away from the equipment.

It will be observed that the cathode of diode 17 is connected to the cathode of device 64 through a resistance 20 and that the anode of diode 17' is connected to the point between resistances 88 and 89. The opposite electrodes of these diodes are connected to the control electrode of device 64.

The control electrode assumes the same potential with respect to ground as that existing at an intermediate point on resistance 88, which is so chosen as to maintain substantially equal biases on the diodes 17 and 17' at the center of the operating range of the equipment. Device 64 now operates as an amplifier of the voltage between the control electrode and the above intermediate point because of the resistance between this point and the source of negative bias potential. The output impedance looking toward device 64 from conductor 92 and ground is high, being that of the usual amplifier.

Condenser 49, however, it is not connected between the control electrode and the said intermediate point. Instead it is connected between the control electrode and ground and thence through resistances 89 and 88 to the cathode. It however assumes a charge corresponding to the potential between control electrode and ground. Now when the diodes are nonconducting, the sole connection of the control electrode to the cathode is through this condenser and the cathode resistors 88 and 89. This discharge device 64 now acts as a cathode follower and has low impedance as measured between conductor 92 and ground.

Thus the device 64 acts as an amplifier during the aperture pulses and as a cathode follower during the time between aperture pulses. It is during these latter times that it controls multivibrator 48. The low impedance between conductor 92 and ground renders the multivibrator 48 less subject to interfering voltages induced from extraneous sources into the circuit of this conductor.

In this way the equipment follows, or automatically tracks, the variations in range of the remote target and since the wave A generated by the multivibrator 48 operates through equipment 52 to control the ammeter 40 in accord with the variations in duration of the positive pulses of wave A, a continuous indication of range is produced.

The circuit of diodes 17 and 17' and device 64, operating as explained, is particularly advantageous in maintaining stability in the time of occurrence of the b and c apertures especially when the time of occurrence of these apertures is not dependent on a received echo, as when no echoes are being received. If the time of occurrence of the b and c apertures is determined by a received echo pulse and then that pulse disappears, or fades, the time of occurrence of the aperture pulses remains substantially the same until the echo reappears. This is due to the fact that diodes 17 and 17' are biased to be nonconducting as previously described so that the charge on condenser 49 is maintained during such periods. Of course noise disturbance, if sufficiently intense, may affect the charge on condenser 49 to some extent.

It is desirable that the particular echo selected by the b and c apertures be indicated on the viewing screen of the cathode ray device. For this purpose switch 79 may be closed to supply one of these aperture pulses—in the equipment shown, the b pulse—over conductor 45 and through device 46 to resistance 12, the potential of which controls the potential of the control electrode of cathode ray device 15. Thus a spot is produced on the screen at a position corresponding to the time when the aperture occurs.

If this spot coincides with an echo indication, it may obscure the echo indication and it may not appear from the screen whether the spot is produced by the aperture pulse or by an echo. The spot 34 may be produced by either. To render these distinguishable, switch 80 is provided and arranged for unicontrol with switch 79 so that when the aperture is supplied to the cathode ray device the time of its occurrence may be manually varied by variation of contact 50 on potentiometer 51. Potentiometer 51 is connected across the source of operating potential and variation of contact 50 thereon varies the charge on condenser 49 thereby varying the time of occurrence of the aperture pulse and the position of the spot produced thereby on the viewing screen. Thus if the operator questions whether spot 34 is produced by an echo or by the aperture, he may move contact 50 and if the spot moves it is an aperture indication. If it remains it is an echo indication.

Of course, the distance between spot 32 produced simultaneously with the radiated pulse and the various echo indications 33 or 34 is a criterion of the distance to the objects producing the different echoes. Equipment 52 and meter 40, shown in the lower portion of Fig. 1, produces a more accurate indication, however, and that equipment will now be described.

This equipment comprises an electron discharge device 94 having its anode connected to the positive side of the source of operating potential and its cathode connected to ground through a resistance 95, a switch in the form of a unilateral conducting device 96 poled in the same direction as the discharge device 94, and resistance 97. The unilateral conducting device is shown as a diode. This latter device 96 and resistance 97 are shunted by one or the other of two series resistance-capacitance combinations 98, 99 or 102, 103 dependent upon the position of switch 104. With switch 104 in the position shown, they are shunted by the first mentioned series combination 98, 99. This switch is unicontrolled with an additional switch 105 in the sweep circuit 22 which varies the duration of the period over which the ray of the cathode ray tube is swept across the viewing screen.

The control electrode of discharge device 94 is connected through a resistance 100 to a variable contact 106 on a potentiometer 107, which is connected in a resistance path between ground and the positive side of the source of operating potential so that this discharge device is normally conducting to an extent dependent on the position of contact 106 on resistance 107. Its control electrode is also connected through a large condenser 108 to the anode of the diode 96 so that this control electrode it at substantially the same alternating current potential as the anode of the diode 96. The cathode of device 96 is connected through a condenser 109 to the anode of the device 48'' in multivibrator 48. Thus the wave A of Fig. 3 is supplied to this cathode of diode 96 rendering it positive with respect to its anode upon the radiation of each transmitted pulse thereby rendering the diode non-conductive. Condenser 99 then begins to charge through device 94 and it charges in accord with the portion 112 of the curve N₁ of Fig. 3 throughout the duration of the positive pulse of the wave A. The slope of this portion 112 of curve N₁ and hence the rate of charge of condenser 99 is dependent on the operation of contact 106 on resistance 107 as well as the size of the capacitor 99. On termination of the positive pulse of the wave A, diode 96 again becomes conducting and the condenser 99 discharges therethrough. Thus a voltage wave of the form indicated at N₁ appears at the point 113. This wave has a peak value dependent upon the range to the object producing the selected echo. Discharge device 94 operates substantially as the ordinary cathode follower, the alternating potential of its cathode being substantially the same as that of its control electrode. Since its control electrode is connected through the large condenser 108 to the point 113, the alternating potential of the cathode is substantially the same as that at the point 113. The result is that this voltage wave N₁ also appears at the cathode of device 94 and is supplied through condenser 114 to the control electrode of discharge device 115. Discharge device 115 operates as a peak detector to produce a voltage on the parallel resistance-capacitance combination 116 having a potential dependent upon the positive peaks of the wave N₁. This unidirectional voltage is supplied to the control electrode of discharge device 117 to control the current flowing in the meter 40 in accord with the range to the target from which the echo is received. The circuits for generating the wave of the form shown by curve N₁, comprising the diode 96 and discharge device 94 and their associated circuits, are described and claimed in my copending application Ser. No. 747,824, filed May 13, 1947, Patent No. 2,570,875, granted October 9, 1951, which is a continuation-in-part of the present application and assigned to the same assignee as the present invention.

Of course, it will be understood that since the wave N₁ is supplied through condenser 114, were nothing further provided it would appear on the grid of device 115 as a wave symmetrical with respect to an alternating current axis and the magnitude of its peaks from such an axis would not necessarily be a measure of range; that is, the direct current component of the wave is removed by condenser 114. For this reason, a direct current restorer is provided comprising diode 118 having its cathode connected to the control electrode and its anode connected through a source of bias potential 119 to ground the diode being shunted by a resistance 120. In this way, portions of the wave negative with respect to a definite fixed potential render the diode conducting and prevent the control electrode from becoming more negative. Thus the voltage wave on the control electrode appears as a variation with respect to this fixed potential the peaks of which have magnitude dependent on the range.

It is desirable that when the target is at zero range the meter 40 should read zero. Since device 117 is normally conducting, a certain current flows therein, however, and it is therefore necessary to the zero indication to balance out his current. This is provided by connecting the meter through resistances 122 and 123 to the negative side of the source of bias potential 18. Accurate adjustment of this balancing effect is provided by a variable resistance 124 connected between ground and a point between the two resistances 122 and 123.

The wave J₁ of Fig. 3 may be taken to represent the current in the deflection coil 19 which reflects the ray across the screen in a time corresponding to 20,000 yards, for example. During this time the pulses which are supplied from the receiver over conductor 7 and through amplifier 8 to the control electrode of device 15 may be represented by the curve L of Fig. 2. If with switch 79 closed the aperture pulse coincides with the received echo, this curve may remain substantially the same as indicated by the curve M of Fig. 2. If the aperture pulse occurs at a different time, as at time 126 as indicated by the curve M₁, then an additional pulse is supplied to the control electrode producing the additional spot on the screen.

If the contact 50 be so adjusted, however, that the aperture pulse 126 coincides with the echo pulse 127, as in the case of the curve M for example, and the switches 79 and 80 be then opened, the equipment locks in with the echo 27 and the meter 40 continuously indicates the range to the object producing this echo. That is, the rise 112 in the curve N₁ begins simultaneously with the radiated pulse and continues until just prior to the receipt of the echo 127 thereby producing a peak of magnitude dependent upon the range to this echo.

It will be noticed that this portion 112 of curve N₁ rises abruptly, as indicated at 128, upon initiation of the positive pulse of wave A. This initial abrupt rise is due to the charging current of condenser 99 flowing in resistance 98, the remaining rise in voltage being entirely due to voltage accumulated on the condenser 99.

It may be desirable to shorten the range of the equipment to, for example, 2,000 yards. This may be done by operating switches 104 and 105 to their left-hand position. The switch 105 alters the circuits of the sweep circuit generator 22 to produce a curent wave in the sweep coil 19 of the form indicated at J₂ in Fig. 2 thereby causing the ray to be swept across the screen in a much shorter period of time. Switch 104 disconnects the resistance-capacitance combination 98, 99 and connects in circuit resistance-capacitance combination 102, 103, this combination including a condenser 103 of much smaller value which charges at a much more rapid rate. The result is a curve of voltage at the point 113 of the form indicated at N₂ in Fig. 3. It will be seen that this voltage has an initial rise 129 due to charging current flowing in resistance 102 and that the voltage then rises gradually as charge accumulates in condenser 103 to the point 130 where it becomes constant and remains constant throughout the remaining duration of the positive pulse of the curve A. This constant voltage is due to limiting action of the diode 96. That is, when the condenser 103 acquires a certain charge, the diode 96 becomes conducting and prevents any further accumulation of charge.

Actually however, since this adjustment is made only to determine the range of targets at less than 2,000 yards distance, contact 50 is moved to shorten the positive pulses of wave A to a corresponding short duration with the result that these pulses are terminated in the slope portion of curve N₂ between portions 129 and 130 and at a time dependent upon receipt of the selected echo. The peak detector 115 and meter 40 thus operate exactly as before to indicate range.

In the lower portion of Fig. 2 are shown a plurality of discharge devices 132, 133 and 134, which operate to produce locally desired pulses, which may be considered as artificial echo pulses, and which may be employed to produce a calibration on the cathode ray screen 28 in the form of a series of regularly spaced illuminated spots, or indicia, as indicated in Fig. 5, all of these indicia being fixed in a predetermined position with respect to the indication corresponding to the radiated pulse. These indicia are useful in calibrating the range indicating meter 40, as will presently be shown.

These devices 132, 133 and 134 are normally deenergized by reason of the fact that switch 54 is open thereby disconnecting their anodes from the source of operating potential. This switch is closed when calibration is desired.

The anode of device 132 is connected through a resonant circuit comprising an inductance 135 and a condenser 136 to the positive terminal of the source of operating potential, and its cathode is connected to ground through a cathode bias resistance 137 shunted by a condenser 138. Its control electrode is connected to ground through resistance 143 and through a coupling condenser 139 to the sweep circuit generator 22, which supplies thereto a square wave of the form indicated at K₁ in Fig. 2 and Fig. 3 having negative pulses coincident with and of the same duration as the rising portion of the wave J₁, it being assumed that the switch 105 is in the position shown in the drawing. With switches 104 and 105 in their alternate positions, the waveform will be as indicated at K₂ in Fig. 2 and Fig. 3, corresponding to the rising portion of wave J₂.

Upon occurrence of the negative pulses of the wave K₁, device 132 is rendered nonconducting by the negative potential supplied to its control electrode. This interrupts the anode current flowing in inductance 135 causing a train of oscillations to be set up in the circuit 135 and 136. This train of oscillations is indicated at 144 of the curve P of Fig. 2. During this train of oscillations the voltage on condenser 138 gradually leaks off through resistance 137 in accordance with the portions 145 of the curve Q of Fig. 3. This bias voltage is present between the cathode and the control electrode of device 133, this latter control electrode being connected to ground through resistance 146. The control electrode of device 133 is also connected through coupling condenser 147 to the anode of device 132 so that the train of oscillations 144 and also the bias voltage of condenser 138 are supplied between the control electrode and cathode of the device 133 where they appear in the relationship expressed by the curves R of Fig. 3.

In this group of curves R, the train of oscillations 144 is shown superposed upon the decaying bias potential 148 which exists between the control electrode and cathode. This bias potential includes the decaying voltage on resistance 137 and such additional voltage as may appear on resistance 146 due to grid rectification in device 133. Only the peaks of the curve 144, which exceed the cutoff voltage 149, cause current to flow in device 133. Thus short pulses of current flow in the anode circuit of the device 133. This anode circuit includes an inductance 153 which has an inherent resonant frequency much higher than the frequency of the circuit 135, 136 and is shunted by a resistance 154. In this way a damped train of oscillations occurs in the inductance 153 upon occurrence of each positive peak of the wave 144. These trains of oscillations are indicated by the curve S of Fig. 3. They are supplied through condenser 155 to the control electrode of the discharge device 134, this control electrode being biased strongly negative from the source of negative bias voltage 18 so that only the initial peak 156 of each of these trains produces current in the anode circuit of device 134. The device 134 operates as a cathode follower having its load resistance 157 connected between the cathode and ground. Thus the potential on this resistance comprises a series of sharp regularly recurring peaks, as indicated by the curve T of Fig. 3. These pulses of the wave T are supplied over conductor 158 to the receiving channel in receiver 6 where they are mixed with the received echo and hence are supplied to the grid of the cathode ray tube over conductor 7 and through amplifier 9.

When it is desired to calibrate the range indicating meter 40, transmitter 3 is turned off and switch 54 is closed thereby placing in operation the discharge devices 132, 133 and 134 to supply the pulses of curve T over conductor 158 to the receiver 6 where they operate just as would echos received at the same time. If these pulses are sufficiently intense the transmitter 3 may be maintained in operation and the sensitivity of the receiver reduced so that received echoes are not transmitted through the receiver to the extent that the artificial echo pulses of curve T are transmitted. These artificial echo pulses of curve T are then supplied through the two amplifiers 36 and 38 to the differentiator circuit 4 exactly as would actual echo pulses be supplied and the system may lock onto, or synchronize itself with, a particular one of the pulses of curve T. The pulses of the curve T, which appear at the output of the receiver, are also supplied back over conductor 7 and amplifier 9 to resistance 12 and thence to the control electrode of cathode ray device 15 to produce the illuminated spots or indicia which are spaced vertically along the viewing screen in the same manner as actual echo pulses, as represented within the circle 28 in Fig. 5. The aperture pulse which is synchronized with one of the calibration pulses may also be transmitted through switch 79, conductor 45 and cathode follower 46 to the control electrode of cathode ray tube 15 to produce a spot thereon agreeing in position with the spot produced by the pulse on which the system locks.

In operation the operator will observe one of the indicia on the cathode ray screen produced by the calibration pulse, as for example the indicia 150, which appears at a point on the screen of the cathode ray tube corresponding approximately to a known range. By closing switch 80 and operating contact 50 he may cause the b and c apertures to occur simultaneously with the particular pulse of the curve T producing the indicia 150, whereupon the system synchronizes itself with, or locks onto, this particular pulse of the curve T. The variable contact on resistance 124 may then be adjusted so that the meter 40 indicates the corresponding range. This is an initial approximate adjustment of the zero reading of meter 40.

The operator may then move contact 50 until the system locks on the pulse producing indicia 151 corresponding to a range different from that indicated by indicia 150 by a known amount corresponding to the number of indicia between the spots 150 and 151. If meter 40 does not now read correctly the different range, he may adjust contact 106 until the meter 40 reads correctly. Usually it is preferable to make an overadjustment at this time and then repeat the adjustments by manipulation of contact 50 to lock the system onto the indicia 150 and 151 alternately and adjusting resistance 124 and contact 106 until the meter 40 reads correctly for both adjustments.

When this has been accomplished the transmitter may again be turned on and the switch 54 opened. Contact 50 may then be moved until the system locks onto the pulse corresponding to the radiated pulse, namely, the pulse producing the illuminated spot 32 in Fig. 4. The variable contact of potentiometer 124 may now be adjusted until the meter 40 reads a calibrated amount. The meter 40 when thus adjusted reads the correct range for all values of range.

The relationship between range and the reading of the meter 40 is, of course, linear, the slope of the curve expressing this relationship being adjustable by the contact 106 which controls the slope of the portion 112 of the curve $N_1$ and the corresponding slope of the curve $N_2$. The adjustment of the variable contact on resistance 124 moves this curve bodily with respect to range until it passes through the point corresponding to zero reading of the meter and zero range.

Of course, if desired, the position on the screen at which a particular echo appears may be compared with the position of a particular range calibration indicia for a rough reading of range. This may be done by alternately closing and opening switch 54 and, if desired, reducing the sensitivity of the receiver or cutting off the transmitter when switch 54 is closed. Usually, however, the range is best determined from the instrument 40.

The calibration circuit involving discharge devices 132, 133 and 134 is disclosed and claimed in copending application of William A. Fitch, Serial No. 522,483, filed February 15, 1944, entitled Pulse Producing System, now Patent 2,423,304 issued July 1, 1947, and assigned to the assignee of my present application.

In the upper portion of Fig. 2, I have shown means which responds to the echo selected by amplifiers 36 and 38 to control the gain of the receiver 5. These selected echoes, in addition to being supplied through diodes 17 and 17' to condenser 49, are also supplied over conductors 163 and 164 to the control electrodes of a pair of discharge devices 165 and 166. The anodes of these two discharge devices are connected in parallel and through a resistance 167 to the source of anode operating potential so that the selected echo appears as a positive pulse on these anodes. The pulse wave appearing on these anodes may be that represented at O in Fig. 3. This pulse wave is amplified by discharge device 168 and appears upon resistance 169 in its cathode circuit. The voltage on resistance 169 is rectified by diode 173, which operates as an ordinary peak detector to produce a voltage on condenser 174, which is shunted by resistance 175, having a magnitude corresponding to the peak voltages of the wave O. In applications where the beam of waves projected from the antenna 1 and parabola 2 is rotated about the surface of a cone, the amplitude of the pulses of the wave O varies cyclically the remote target be positioned other than at the axis of the parabola 2, with the result that a cyclical variation in voltage having the frequency of rotation of the antenna, which may be 60 cycles per second, appears on condenser 174 and resistance 175. This voltage may be supplied through condenser 176 to antenna orientation equipment (not shown) to maintain the antenna directed at the remote target, as described in the above referred to application of Sidney Godet. For my present purposes, however, this cyclical variation is filtered out by a filter comprising resistance 177 and condenser 178 through which the voltage on condenser 174 is supplied to delay diode 179 and resistance 183. Thus a substantially steady voltage varying with the intensity of the received echo pulses appears on resistance 183.

The anode of discharge device 184 is connected to the positive terminal of the source of operating potential, and its cathode is connected to the negative terminal of the bias source 18 through resistances 185 and 186. The control electrode of device 184 is connected through resistance 183 to the point between these two resistances. A delay bias is maintained across the diode 179 since the lower terminal of resistance 175 is connected through conductor 188 to a point between resistances 189 and 193 the latter two resistances comprising, together with resistances 185 and 186, a bleeder path across the two sources of potential 3 and 18. Thus normally no current flows in resistance 183 because of the nonconductivity of the device 179, but when the echoes become sufficiently great to produce sufficient voltage upon condenser 174 the cathode of device 179 becomes negative with respect to the anode producing a flow of current in resistance 183. The voltage variation on this resistance appears in amplified form at the cathode of discharge device 184 and is supplied over conductor 194 to the receiver 6 to control the gain thereof. The voltage on conductor 194 may be utilized in any conventional way to control the bias potential on the control grid or screen grid of one or more of the amplifiers of the receiver to control the gain thereof.

In this way it has been found that a very rapid control of the gain of the receiver may be had in response to echoes of rapidly varying intensity. It often occurs, for example, in receiving echoes from a remote aircraft that due to changes in the attitude of the aircraft the echo is received from different reflecting surfaces thereof at varying times, with the result that their intensity changes at a rapid rate at the receiver. The action of the gain control as thus described is such as to compensate for such rapid variations. At the same time, by reason of the action of the filter 177, 178, it does not respond to the cyclical variations produced by rotation of the antenna and thus does not obliterate such cyclic variations in the received signal.

During manual tracking, by variation of the contact 59 when switches 80 and 79 are closed it is desirable to provide for manual control of the gain of the receiver. For this reason an additional switch 195 is provided and arranged for unicontrol with switches 79 and 80 so that it is closed when those switches close. This switch 195 connects the cathode of diode 179 to a variable contact 196 on a potentiometer resistance 197 one terminal of which is connected to ground and the other terminal of which is connected through a resistance 198 to the negative terminal of the bias source 18. By varying this contact 196 along resistance 197, the potential of the cathode of the diode 179 is varied with respect to the anode thereof thereby varying the current in resistance 183 and hence the voltage on conductor 194 which controls the gain of the radio receiver. I have found in the operation of the system that operation of switch 195 introduces no undesired transient effects because of the delay action of condenser 178.

While I have illustrated a particular embodiment of my invention, it will of course be understood that I do not wish to be limited thereto since various modifications both in the circuit arrangement and in the instrumentalities may be made, and I contemplate by the appended claims to cover any such modifications as fall within the true spirit and scope of my invention.

What I claim as new and desire to secure by Letters Patent of the United States is:

1. In combination, a pulse transmitter, an echo differential device, means to receive echoes of said pulses and to transmit said echoes through separate paths to said differential device, a multivibrator, a pulse generator, means to key said transmitter to transmit a pulse at a time fixed in the cycle of said multivibrator and to key said pulse generator to generate a pulse at a time variably later in said cycle, means to supply said pulse to said paths over successive intervals, said paths being normally inoperative and each path including means to render it operative during said pulses whereby said paths are operative over said successive intervals, said differential device including means to integrate the pulses transmitted through said paths and to differentiate the integrals produced thereby, and means responsive to the difference between said integrals to control the time when said pulse generator is keyed.

2. In combination, means to transmit recurrent pulses, means to receive echoes of said pulses over two intervals occurring in succession after each pulse, means to integrate said echoes over the respective intervals and to produce a potential dependent on the difference in the integrals produced, said means comprising a pair of unilateral conducting devices and an electron discharge device having an anode, a cathode, and control electrode, said unilateral devices being connected in respective paths between said control electrode and cathode and poled oppositely, a condenser connected between said control electrode and cathode, and means to supply the echoes received in said respective intervals through the corresponding unilateral device to said condenser whereby said condenser assumes a charge dependent on the difference between the integrals of said echoes and said charge controls the current in said electron discharge device, and means responsive to said current to supply a bias across said unilateral devices such that said devices are normally nonconductive.

3. In combination, means to transmit recurrent pulses, means to receive echoes of said pulses, a condenser, a pair of unilateral conducting devices, means to supply to said condenser echoes received during two intervals occurring in succession after each transmitted pulse, the echo received during one interval being supplied through one of said pair of devices and the echo received during the other interval being supplied through the other of said pair of devices and said devices being poled oppositely to produce a charge in said condenser varying as the difference in the echoes received in said intervals, and an electron discharge device having a control electrode circuit and an anode circuit and a resistance common to said circuits, said unilateral conducting devices each being connected for unidirectional bias potential between the control electrode of said discharge device and a point on said resistance.

4. In combination, means to transmit recurrent pulses, means to receive echoes of said pulses, a condenser, a pair of unilateral conducting devices, means to supply to said condenser echoes received during two intervals occurring in succession after each transmitted pulse, the echo received during one interval being supplied through one of said pair of devices and the echo received during the other interval being supplied through the other of said pair of devices and said devices being poled oppositely to produce a charge in said condenser varying as the difference in the echoes received in said intervals, an electron discharge device having a control electrode, a cathode, and an anode, a resistance having one terminal connected to said control electrode and anode and another terminal connected to said cathode, means to vary the voltage on said control electrode in accord with the voltage on said condenser, and means to bias said unilateral conducting devices to be non-conductive in the absence of a received echo, said last means comprising a connection from one electrode of each unilateral conducting device to said control electrode and a connection from the other electrode of each unilateral conducting device to a point on said resistance at which the potential varies in accord with the variations on said control electrode.

5. The combination, in a pulse echo system, of a pair of electron discharge devices, each having an output electrode connected to ground through a unilateral conducting device and a condenser in that order, means to render said discharge devices operative over successive apertures of time and to supply echoes through said devices during said apertures, one of said unilateral devices being poled to charge its associated condenser in response to an echo supplied through the corresponding discharge device, a discharge path for said last mentioned condenser through the other unilateral device, said other unilateral device being poled to be rendered conductive in response to an echo supplied through the other discharge device, a third electron discharge device having a control electrode circuit including said last mentioned condenser, an output circuit and a resistance common to said circuits, and means to vary the potential on one side of each unilateral device with the potential of said cathode and that of the other side of each unilateral device with the potential of said control electrode.

6. The combination, in a pulse echo system, of a pair of electron discharge devices, each having an output electrode connected to ground through a unilateral conducting device and a condenser in that order, means to render said discharge devices operative over successive apertures of time and to supply echoes through said devices during said apertures, one of said unilateral devices being poled to charge its associated condenser in response to an echo supplied through the corresponding discharge device, a discharge path for said last mentioned condenser through the other unilateral device, said other unilateral device being poled to be rendered conductive in response to an echo supplied through the other discharge device, a third electron discharge device having a control electrode circuit including said last mentioned condenser, an output circuit and a resistance common to said circuits, means to vary the potential on one side of each unilateral device with the potential of said cathode and that of the other side of each unilateral device with the potential of said control electrode, and means responsive to the voltage on said resistance to vary the time of occurrence of said apertures.

7. In combination, a condenser, a pair of unilateral conducting devices, means to charge said condenser during a periodically-recurring interval of time through one of said unilateral devices, means to discharge said condenser through the other unilateral device during a succeeding time interval, an electron discharge device having a control electrode circuit including said condenser, an anode circuit and a resistance common to said circuits, whereby the potential of the cathode of said discharge device varies in the same sense as the potential of said control electrode, one electrode of each of said unilateral devices being connected for unidirectional potential to said control electrode and the other electrode of each unilateral device being connected for unidirectional current to said cathode.

8. In combination, means to transmit periodic pulses, two normally inoperative receiving channels of echoes of said pulses, a multivibrator, means to trigger said multivibrator at a time fixed relative to each transmitted pulse, said multivibrator including means to control the duration of its output pulse in accordance with the potential of one of its electrodes, means responsive to interruption of said output pulse to render said channels operative in succession over brief intervals of time, a condenser, a pair of unilateral conducting devices, an electron discharge device having a resistance common to its grid and anode circuits, means to charge said condenser through one of said unilateral conducting devices in response to echoes transmitted through one of said channels and to discharge said condenser through the other unilateral conducting device in response to echoes transmitted through the other channel, means to vary the control electrode potential of said discharge device in accord with the charge on said condenser, and means to regulate the potential on said one electrode of said multivibrator in accord with the potential on said resistance.

9. In combination, means to transmit periodic pulses, two normally inoperative receiving channels for echoes of said pulses, a multivibrator, means to trigger said multivibrator at a time fixed relative to each transmitted pulse, said multivibrator including means to control the duration of its output pulse in accordance with the potential of one of its electrodes, means responsive to interruption of said output pulse to render said channels operative in succession over brief intervals of time, a condenser, a pair of unilateral conducting devices, and an electron discharge device having a resistance common to its grid and anode circuits, means to charge said condenser through one of said unilateral conducting devices in response to echoes transmitted through one of said channels and to discharge said condenser through the other unilateral conducting device in response to echoes transmitted through the other channel, means to vary the control electrode potential of said discharge device in accord with the charge on said condenser, and means to regulate the potential on said one electrode of said multivibrator in accord with the potential on said resistance and to regulate the potential between the electrodes of said unilateral conducting devices in accord with the potential on said resistance.

10. The combination, in a pulse echo system, of a multivibrator, means to transmit recurrent pulses and to trigger said multivabrator in fixed time relation to the transmitted pulses whereby said multivibrator initiates a pulse in fixed time relation to each transmitted pulse, means responsive to receipt of a desired echo to terminate said pulse whereby said pulses have duration dependent on the range from which said echo is received, an electron discharge device and a condenser connected in series, means to charge said condenser through said discharge device during each of said pulses and to discharge it thereafter, means to control the conductivity of said discharge device in response to the voltage on said condenser to render the charging of said condenser linear with respect to the duration of said pulses produced by said multivibrator, and means responsive to the peak voltage on said condenser to indicate the range from which said echo is received.

11. The combination, in a pulse echo system of the type wherein recurrent pulses are transmitted and echoes thereof are received from a distant object, of means to generate a wave having pulses of length varying with the time interval between pulses transmitted by said system and receipt of echoes thereof, a source of operating potential, a pair of normally conducting electron discharge devices connected in series across said source, one of said devices being shunted by a condenser, means to apply said pulses of varying length to said one of said devices to render it nonconducting whereby said condenser is charged through the other of said devices to an extent dependent on the duration of said pulses, and means responsive to the peak voltage on said condenser to indicate the range to said object from which said echoes are received.

12. The combination, in a pulse echo system of the type wherein recurrent pulses are transmitted and echoes thereof are received from a distant object, of means to generate a wave having pulses of length varying with the time interval between pulses transmitted by said system and receipt of echoes thereof, a source of operating potential, a pair of normally conducting electron discharge devices connected in series across said source, one of said devices being shunted by a condenser, means to apply said pulses of varying length to said one of said devices to render it nonconducting whereby said condenser is charged through the other of said devices to an extent dependent on the duration of said pulses, means responsive to increase in voltage on said condenser to increase the conductivity of said device thereby to increase the linearity of increase in said voltage, and means responsive to the peak voltage on said condenser to indicate the range to said object from which said echoes are received.

13. The combination, in a pulse echo system of the type wherein recurrent pulses are transmitted and echoes thereof are received from a distant object, of means to generate a wave having pulses of length varying with the time interval between pulses transmitted by said system and receipt of echoes thereof, a source of operating potential, a unilateral conducting device, a first condenser in shunt with said unilateral device, a second condenser, an electron discharge device having an anode connected to the positive terminal of said source, a cathode connected to the negative terminal of said source through said unilateral conducting device, said unilateral device being poled to be normally conducting to maintain said first condenser discharged, a control electrode connected through said second condenser to said cathode, whereby the voltage of said first condenser is applied through said second condenser to said control electrode, means to apply said pulses of varying length to said unilaterally conducting device to render it conducting whereby said first condenser charges, and range indicating means responsive to the voltage on said first condenser.

14. The combination, in a pulse echo system, of means to transmit pulses at a rate subject to variation, a cathode ray device having a viewing screen, means to deflect the ray of said device across said screen during a predetermined interval after each transmitted pulse, means to select an echo received during said interval and to produce an indication thereof on said screen at a position corresponding to the range from which it is received, a separate range indicating instrument having an index, electrical range measuring means for developing a potential dependent upon said predetermined interval, means to supply said potential to said instrument thereby to position said index in response to and in accord with the time of receipt of said selected echo, means to supply to said cathode ray device a plurality of regularly recurring pulses having fixed time relation to said transmitted pulses to produce regularly spaced indicia on said screen positioned to correspond to range, and calibrating means independently to adjust said electrical range indicating means for agreement between the range indications produced by said range indicating instrument and by said cathode ray device.

15. The combination, in a pulse indicating system, of means to transmit recurrent pulses and to receive echoes thereof, a cathode ray device having a viewing screen, means to deflect the ray of said device over said screen in either of two different predetermined time intervals and to modulate said ray by the receiving echo to indicate said echoes on said screen in space sequence corresponding to the time sequence in which they are received, means to select one of said echoes, a pair of condensers, means to charge one of said condensers to an extent dependent on the time of receipt of the selected echo, and means to select said condenser charged by said last means in accord with the time interval in which said ray is deflected across said screen.

16. The combination, in a pulse echo ssytem, of means to transmit recurrent pulses and to receive echoes thereof, a cathode ray device, means to indicate said echoes on said cathode ray device in space sequence corresponding to the time sequence in which they are received, two normally inoperative paths for said echoes, means to render said paths operative over successive intervals after each transmitted pulse to select a desired echo, a condenser, means to charge said condenser in response to the portion of said echo received through one path and to discharge it in response to the echo received through the other path, a range indicator, means responsive to the voltage on said condenser to control the time of occurrence of said successive intervals and to control said range indicator, a source of unidirectional voltage, and means to connect said condenser across a variable portion of said source to change the echo selected and the indication produced by said range indicator.

17. The combination, in a pulse echo system, of a pulse transmitter, a pulse receiver, a cathode ray device having a viewing screen, means to indicate on said viewing screen echoes received in said receiver in space sequence corresponding to the time sequence in which they are received, a range tracking system including means to select a particular echo from echoes received in said receiver and means to indicate continuously the range from which it is received during variation in said range, means to supply to said receiver artificial echo pulses in fixed time relation to each other and to pulses transmitted by said transmitter whereby fixed indicia appear on said viewing screen, and means independently to adjust said range tracking system to select any desired one of said artificial echo pulses, thereby to provide a known range calibration indication on said indicating means.

18. The combination, in a pulse echo system, of a pulse transmitter, a pulse receiver, a cathode ray device having a viewing screen, means to indicate on said viewing screen echoes received in said receiver in space sequence corresponding to the time sequence in which they are received, a range tracking system including means to select a particular echo from echoes received in said receiver and means to indicate continuously the range from which it is received during variation in said range, means to supply to said receiver artificial echo pulses in fixed time relation to each other and to pulses transmitted by said transmitter whereby fixed indicia appear on said viewing screen, means independently to adjust said range tracking system to select any desired one of said artificial echo pulses, thereby to provide a known range calibration indication on said indicating means, and means to reduce the sensitivity of said receiver to receive actual echoes whereby the indication of such echoes on said screen is reduced during appearance thereon of said fixed indicia.

19. The combination, in a pulse echo system, of a pulse transmitter, a range tracking system including means to select a particular echo from echoes received in said receiver and to indicate continuously the range from which it is received during variation in said range, means to rectify said selected echo to produce a voltage of magnitude corresponding to the peak thereof, an electron discharge device having a grid circuit and an anode circuit, a resistance common to said circuits and a resistance individual to said grid circuit, a unilateral conducting device, means to supply said voltage through said unilateral conducting device to said individual resistance to control the voltage on said common resistance, and means to regulate the gain of said receiver and the bias voltage across said unilateral conducting device in response to the voltage on said common resistance, said unilateral device being poled to be conducting only when said voltage produced by said rectifying means exceeds a value dependent on said bias voltage.

20. In combination, means to transmit periodic pulses, two normally inoperative receiving channels for echoes of said pulses, a pulse generator, a multivibrator, means to trigger said multivibrator at a time fixed relative to each transmitted pulse, said multivibrator including means to control the duration of its output pulse in accordance with the potential of one of its electrodes, means to key said pulse generator to generate a brief pulse in response to interruption of said output pulse, means to supply said brief pulse to each of said channels to render it operative for the duration of said brief pulse, said last means comprising two signal paths, each coupling the output of said pulse generator to an individual one of said receiving channels, said signal paths exhibiting different time delay characteristics so as to render said channels sequentially operative, and means responsive to the difference between the integrated intensities of the echoes supplied through said channels to control the potential on said one electrode of said multivibrator.

21. In combination, means to transmit periodic pulses, two normally inoperative receiving channels for echoes of said pulses, a pulse generator, a multivibrator, means to trigger said multivibrator at a time fixed relative to each transmitted pulse, said multivibrator including means to control the duration of its output pulse in accordance with the potential of one of its electrodes, means to key said pulse generator to generate a brief pulse in response to interruption of said pulse, means to supply said brief pulse to each of said channels to render it operative for the duration of said brief pulse, said last means comprising two signal paths, each coupling the output of said pulse generator to an individual one of said receiving channels, said signal paths exhibiting different time delay characteristics so as to render said channels sequentially operative, means responsive to the difference between the integrated intensities of the echoes supplied through said channels to control the potential on said one electrode of said multivibrator, thereby to control the duration of the pulses produced by said multivibrator, and means responsive to the duration of said last pulses to indicate the range from which said echoes are received.

ROBERT L. SINK.

REFERENCES CITED

The following references are of record in the file of this patent:

UNITED STATES PATENTS

| Number | Name | Date |
|---|---|---|
| 2,121,117 | Conover | June 21, 1938 |
| 2,121,359 | Luck | June 21, 1938 |
| 2,143,035 | Smith | Jan. 10, 1939 |
| 2,178,074 | Jakel et al. | Oct. 21, 1939 |
| 2,189,549 | Hershberger | Feb. 6, 1940 |
| 2,221,517 | Holters | Nov. 12, 1940 |
| 2,227,598 | Lyman et al. | Jan. 7, 1941 |
| 2,300,999 | Williams | Nov. 3, 1942 |
| 2,329,137 | Richards | Sept. 7, 1943 |
| 2,406,358 | Doba | Aug. 27, 1946 |
| 2,419,541 | De Rosa | Apr. 29, 1947 |
| 2,421,018 | De Rosa | May 27, 1947 |
| 2,432,196 | Hershberger | Dec. 9, 1947 |
| 2,433,667 | Hollingsworth | Dec. 30, 1947 |
| 2,439,256 | Lord | Apr. 6, 1948 |
| 2,460,827 | Isely | Feb. 8, 1949 |
| 2,468,097 | Moore | Apr. 26, 1949 |
| 2,495,753 | Mozley | Jan. 31, 1950 |

FOREIGN PATENTS

| Number | Country | Date |
|---|---|---|
| 469,417 | Great Britain | July 26, 1937 |
| 552,072 | Great Britain | Mar. 22, 1943 |